Aug. 19, 1958 J. E. BRIDGES 2,847,768

SUBSCRIPTION TELEVISION ENCODING APPARATUS

Filed March 29, 1954 3 Sheets-Sheet 1

JACK E. BRIDGES
*INVENTOR.*

BY Francis W. Crotty

HIS ATTORNEY

Aug. 19, 1958 J. E. BRIDGES 2,847,768

SUBSCRIPTION TELEVISION ENCODING APPARATUS

Filed March 29, 1954 3 Sheets-Sheet 2

JACK E. BRIDGES
*INVENTOR.*

BY Francis W. Crotty

HIS ATTORNEY.

SUBSCRIPTION TELEVISION ENCODING APPARATUS

Filed March 29, 1954 3 Sheets-Sheet 3

JACK E. BRIDGES
*INVENTOR.*

BY Francis W. Crotty

HIS ATTORNEY.

United States Patent Office 2,847,768

Patented Aug. 19, 1958

2,847,768

SUBSCRIPTION TELEVISION ENCODING APPARATUS

Jack E. Bridges, Franklin Park, Ill., assignor to Zenith Radio Corporation, a corporation of Delaware Application March 29, 1954, Serial No. 419,301

1 Claim. (Cl. 35—4)

This invention relates to subscription television systems in which a television signal is transmitted in coded form to be utilized only in subscriber receivers having appropriate decoding apparatus actuated in accordance with the coding schedule employed at the transmitter. Since the invention is applicable to either a transmitter or receiver, the term "encoding" is used herein in its generic sense to encompass either coding at the transmitter or decoding at the receiver.

Subscription television systems have been proposed in which a television signal is coded according to a selected coding schedule determined, at least in part, by a plurality of code-determining devices individually having a plurality of operating positions and collectively establishing a prescribed code pattern in accordance with the instantaneous positions of each of the devices with respect to one another. One such arrangement is shown in copending application Serial No. 270,557, filed February 8, 1952, and issued June 4, 1957, as Patent 2,794,851, in the name of George V. Morris, and assigned to the present assignee. In the system described in that application a plurality of individual control or coding signals are supplied from a corresponding plurality of code-determining devices, such as rotating code-storage discs or tapes, to the encoding apparatus of the system. Preferably, at least two of the control signals represent predetermined and different coding schedules and they are applied to the input circuits of a selector, such as an electronic switch. The selector is actuated by a signal developed from another one of the code discs, and in accordance with a selecting schedule, to effect selective or alternative application of the control signals to the encoding apparatus. In order to increase the coding complexity, the various code-determining discs are independently controlled to change the phase of the control signals with respect to one another. This may be achieved by manually adjusting, for example at the beginning of each subscription program, the relative angular position or orientation of each disc with respect to the others.

Another system wherein code-determining devices are employed which collectively represent a code pattern is shown in copending application Serial No. 326,107, filed December 15, 1952, in the name of Jack E. Bridges, and assigned to the present assignee. In that system, a switching arrangement comprises a group of code-determining devices or switches which establish a pattern of interconnections between a series of input and output circuits to partially control the operation of an encoding mechanism. More specifically, a combination of encoding signal components, individually having a predetermined identifying characteristic such as frequency, is transmitted to subscriber receivers along with the composite video signal. These components, which are preferably randomly-sequenced and randomly-appearing within the combination, are derived from the video signal at the receiver and by means of suitable filters are segregated from one another for application over assigned input circuits to a code determining or transposition mechanism. The mechanism may employ a family of toggle switches and selectively establishes a multiplicity of circuit connections between these input circuits and a plurality of output circuits which are connected to various input terminals of a multi-stable actuating device, such as a bi-stable multivibrator. With this arrangement, the encoding signal components may be applied to the multi-stable actuating device in a prescribed sequence to operate that device from one to another of its stable operating conditions. The relative timing of the video and synchronizing components of the television signal are changed with variations in operating condition of the actuator, and in this manner the operating mode of the system is changed at irregular or random intervals to effect encoding.

The present invention may be incorporated in the systems of the Bridges and Morris applications, as well as many others, and is calculated to improve the secrecy aspects in order to eliminate or minimize unauthorized utilization or pirating of the subscription telecast. The invention provides an apparatus for conveniently setting up the code-determining devices to any one of an extremely large number of code combinations by an authorized person, but yet rendering it virtually impossible for an unauthorized person employing a trial and error method to adjust the code-determining devices to the correct setting. Moreover, to provide security against clandestine appropriation and distribution of the switch setting information, each subscriber may be provided with a code-determining device or transposition mechanism which requires different switch settings to decode a particular broadcast than any other subscriber's mechanism, and the construction of the mechanisms may be such as to preclude ascertainment of the relationships between the individual mechanisms by comparison of switch settings obtained in an authorized manner.

It is, accordingly, an object of the present invention to provide an encoding apparatus for a subscription television system which includes an improved mechanism for adjusting the code-determining devices to enhance the secrecy aspects of the system.

It is another object of the invention to provide an encoding apparatus for a subscription television system having an improved transposition mechanism to minimize the possibilities of unauthorized reception.

It is still another object of the invention to provide such an improved transposition mechanism that lends itself readily to mass production techniques on an economical basis.

It is a further object of the invention to provide such an improved transposition mechanism that is relatively simple to operate in view of its coding capabilities.

It is a still further object of the invention to provide a new and improved transposition mechanism which may be produced economically on a large scale with mass production techniques such as the use of identical parts and identical electrical wiring, and yet may be conveniently adjusted to provide a relationship between dial settings and switch settings which is unique and different than that of any other of a large number of similar mechanisms, so that a large number of subscribers in a particular receiving area may each be provided with a code-determining device which bears no readily ascertainable relationship to those of other subscribers in the same area.

An encoding apparatus for a subscription television system, in accordance with the invention, includes a plurality of code-determining devices individually having a plurality of operating positions and collectively establishing a prescribed code pattern in accordance with the instantaneous positions of each of the code-determining devices with respect to one another. A movable mechanism is coupled to an assigned one of the code-determining devices for varying the operating position thereof. Finally, the encoding apparatus comprises a plurality of actuating devices individually mechanically coupled to the movable mechanism for individually partially determining the position of the movable mechanism and conjointly controlling the operating position of the assigned code-determining device, at least one of the actuating devices also at least partially controlling the operating position of another one of the code-determining devices.

The features of this invention which are believed to be new are set forth with particularity in the appended claim. The invention, together with further objects and advantages thereof, may best be understood, however, by reference to the following description in conjunction with the accompanying drawings, in which:

The encoding apparatus of the invention is shown and hereinafter described as employed in a system of the type disclosed in the aforementioned Bridges application, but it will be readily apparent that with only simple modifications this apparatus may be used in systems of the type described in the aforementioned Morris case, or for that matter in any of the prior systems which include adjustable code-determining devices or a transposition mechanism.

Figure 1:
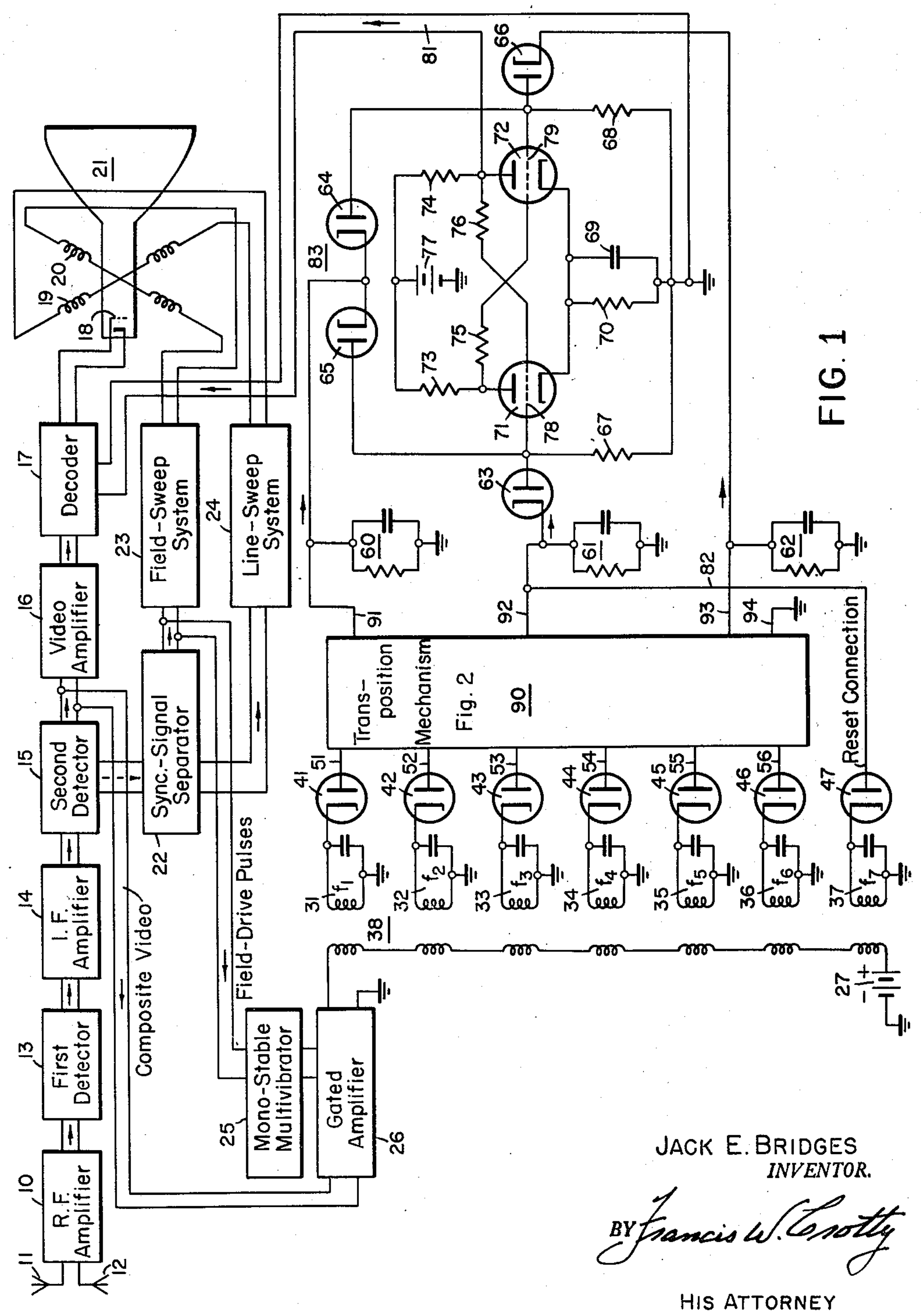
Figure 1 is a schematic diagram of a subscription telecision receiver including an encoding apparatus constructed in accordance with the invention.

The receiver of Figure 1, which may utilize a telecast originating at a transmitter constructed in accordance with the aforementioned Bridges application, comprises a radio-frequency amplifier 10 having input terminals connected to an antenna circuit 11, 12 and output terminals connected to a first detector 13, the output terminals of the detector being connected to an intermediate-frequency amplifier 14. The output terminals of the intermediate-frequency amplifier are connected through a second detector 15 to a video amplifier 16 which, in turn, is coupled through a decoder 17 to the input electrodes 18 of a cathode-ray image-reproducing device 21. Decoder 17 may be similar to that disclosed and claimed in copending application Serial No. 243,039, filed August 22, 1951, and issued August 7, 1956 as Patent 2,758,153, in the name of Robert Adler, and assigned to the present assignee. It may comprise a beam-deflection tube having a pair of output circuits which may be selectively coupled into the video channel as the electron beam thereof is deflected from one to the other of two segmental anodes coupled to such output circuits in synchronism with the mode changes of the transmitted signal. One of these circuits includes a time-delay network so that the variations in the timing of the video components relative to the synchronizing components of the received television signal may be compensated effectively to decode the television signal as the beam of the deflection tube is switched between its anodes. This switching effect is accomplished by means of a beam-deflection control or actuating signal applied to decoder 17, as explained hereinafter.

Second detector 15 is also coupled to a synchronizing-signal separator 22 which is coupled in turn to a field-sweep system 23 and to a line-sweep system 24. The output terminals of sweep systems 23 and 24 are connected respectively to field-deflection elements 20 and line-deflection elements 19 associated with reproducing device 21.

In an illustrative embodiment of the system, the encoding signal and an associated reset signal may comprise seven bursts of various signal frequencies which are individually transmitted between the line-drive pulses superimposed on the vertical-blanking pulse, as explained in the aforesaid Bridges application. In order to facilitate the separation of these signal components it is desirable to provide circuitry which will "gate in" only that portion of the composite video signal containing such components. To that end, field-drive pulses are derived from synchronizing-signal separator 22 and supplied to a mono-stable multivibrator 25 having output terminals connected to a normally-closed gated amplifier 26. The output terminals of second detector 15 are also connected to gated amplifier 26 to supply the composite video signal thereto, and the output circuit of this amplifier is completed through a sectionalized primary winding of a transformer 38 to the positive terminal of a source of unidirectional operating potential, here shown as a battery 27 the negative terminal of which is connected to ground. A series of secondary windings of the transformer constitute the inductive branches of a series of frequency-selective tuned circuits 31—37, individually resonant at a particular one of the seven frequencies employed in coding. Selectors 31 to 36 are connected by means of associated diode rectifiers 41—46 to a group of input circuits 51—56 of a code-determining or transposition mechanism 90 while selector 37 is directly connected via a reset connection 82 to a parallel resistance-capacitance load circuit 61.

As far as the technique of coding is concerned, the transposition mechanism is provided merely for the purpose of selectively connecting any one of input circuits 51—56 to any one of four output circuits 91—94. If the various interconnections established by mechanism 90 are identical to the inter-connections established by a similar transposition mechanism in the encoding apparatus at the transmitter, decoding will be effected. The mechanism setting information is disseminated only to authorized subscribers and a suitable charge may, of course, be assessed for such information.

Figure 2:
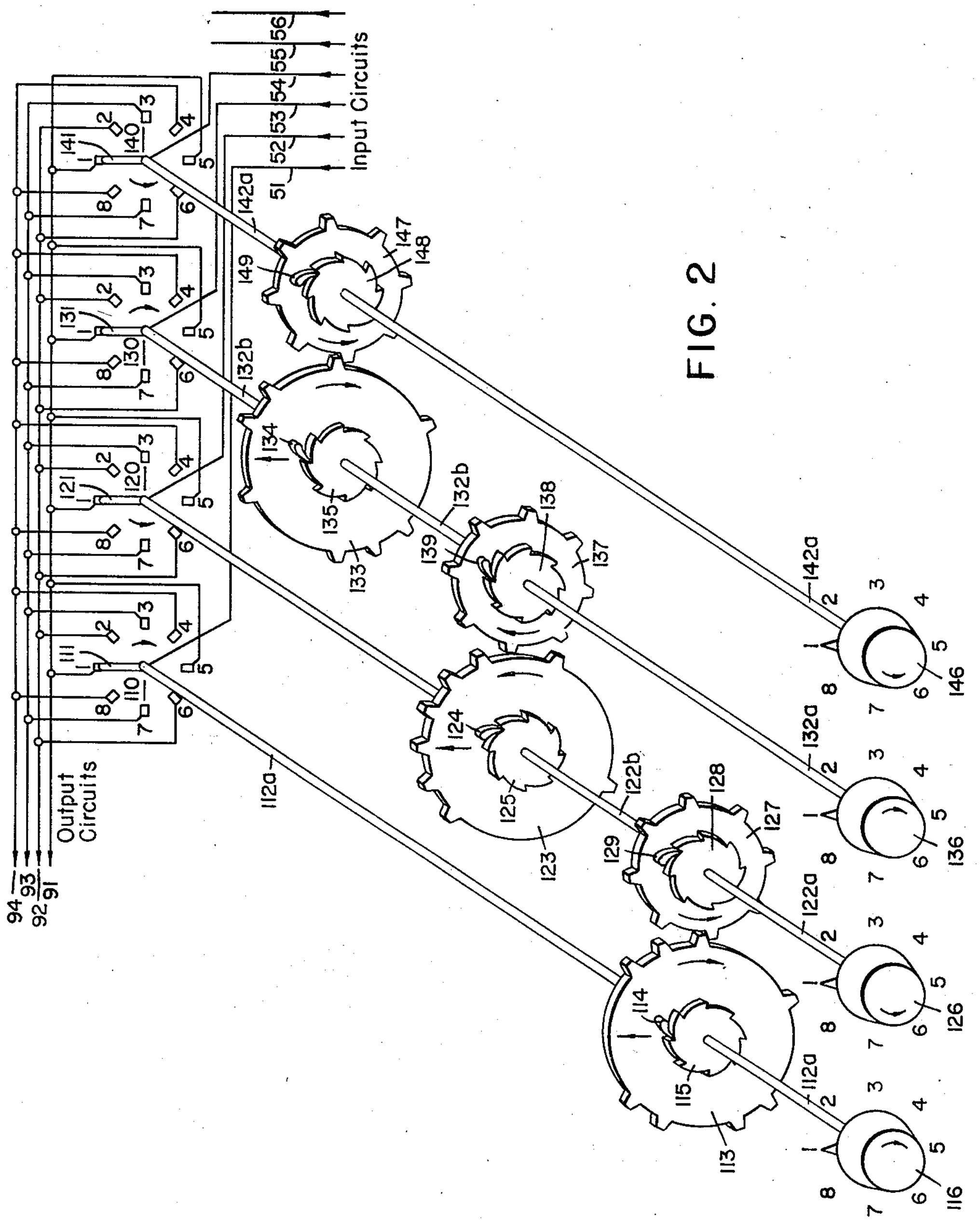
Figure 2 is a schematic representation of the novel mechanism for adjusting the code-determining devices, specifically the transposition mechanism, incorporated into the encoding apparatus shown in Figure 1.
Figure 3A:
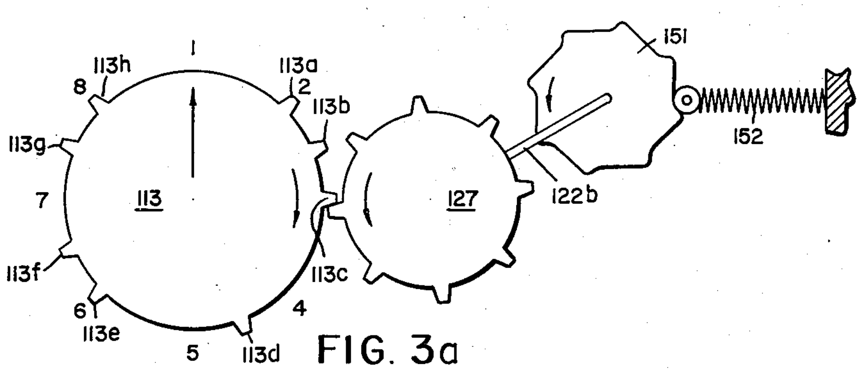
Figures 3*a*–3*c* and 4 are detailed representations of some of the components of the mechanism of Figure 2.

While a simple switching apparatus, such as a series of directly operated four-position rotary switches or a toggle switch arrangement as illustrated in the copending Bridges application, may be employed to effect the required interconnections, it is desirable to provide a transposition mechanism that not only is simple to set up but also adds a considerable degree of security against unauthorized interception of the decoding information. One embodiment of a transposition mechanism constructed in accordance with the invention is shown in Figures 2 and 3 and described in detail hereinafter.

Output circuits 91—93 are connected respectively to three parallel resistance-capacitance load circuits 60—62 while output circuit 94 is connected to a point of reference potential such as ground. Load circuit 60 is connected through a pair of isolating diodes 65, 64 to the control electrodes 78, 79 of a pair of electron-discharge devices 71, 72, respectively, of an actuator 83. The actuating device as illustrated may take the form of a well-known bi-stable multivibrator which has two stable operating conditions. Control electrodes 78 and 79 are connected to ground through resistors 67 and 68, respectively. Load circuits 61 and 62 are also connected to control electrodes 78, 79 through isolating diodes 63 and 66, respectively. The anode of device 71 is cross-coupled to the control electrode 79 of device 72 through a resistor 75, and the anode of device 72 is cross-coupled to the control electrode 78 of device 71 through a resistor 76. The anodes of devices 71 and 72 are also connected through resistors 73 and 74, respectively, to a source of positive unidirectional operating potential, here shown as a battery 77, and the cathodes of devices 71 and 72 are connected together and through the parallel combination of a resistor 70 and a capacitor 69 to a ground connection. The anode of device 72 is connected to decoder 17 via conductors 81 to provide an actuating or deflection control signal therefor. With such an arrangement, multivibrator 83 may be actuated to one of its operating conditions in response to pulses applied thereto over the input circuit including load circuit 61, actuated to the other one of its operating conditions responsive to applied pulses over the input circuit including load circuit 62, and actuated from its instantaneous condition to its alternate condition in response to applied pulses over the input circuit including load circuit 60.

Inasmuch as a complete description of the coding technique is included in the copending Bridges application and since the coding technique itself forms no part of the present invention, the operation of the receiver of Figure 1 will be described briefly. In operation, the coded television signal is intercepted by antenna circuit 11, 12, amplified in radio-frequency amplifier 10 and heterodyned to the selected intermediate frequency of the receiver in first detector 13. The resulting intermediate-frequency signal is amplified in intermediate-frequency amplifier 14 and detected in second detector 15 to produce a composite video signal. This latter signal is amplified in video amplifier 16, passed through decoder 17, and impressed on the input electrodes 18 of image-reproducing device 21 to control the intensity of the cathode-ray beam of the device in well-known manner.

The synchronizing components are separated in separator 22, the field-synchronizing components being utilized to synchronize sweep system 23 and, hence, the field scansion of image-reproducing device 21, whereas the line-synchronizing components are utilized to synchronize sweep system 24 and, therefore, the line scansion of device 21. Of course, the sound-modulated carrier received along with the video carrier is translated in the usual way through an audio system which has been omitted from the drawings for the purpose of simplicity.

Field-drive pulses from separator 22 are supplied to mono-stable multivibrator 25 to produce a gating pulse for normally-closed gated amplifier 26. The parameters of the multivibrator are so chosen that the pulse output therefrom, which opens gate 26, overlaps, in point of time, that portion of the field-retrace interval of the composite video signal which includes the reset pulse and the other encoding signal pulses. The composite video signal is continuously applied to the input circuit of amplifier 26, but only the information contained during the interval of the gating pulse is translated to the primary winding of transformer 38. Amplifier 26 is thus "open" during the times the signal bursts of various frequencies, representing the combination of coding signal pulses, are received and since selector circuits 31—37 are individually tuned to an assigned one of these frequencies, such bursts are separated out from the composite video signal and from each other. Each time a burst of signal frequency occurs in the encoding signal combination, it is channeled over a corresponding input circuit 51—56 to one of the output circuits 91—94 for selective application to one of the input circuits of bi-stable multivibrator 83 or, in the case of output circuit 94, directly to ground.

The encoding apparatus at the transmitter preferably is identical to that described at the receiver so that if the various code-determining devices are adjusted to the same setting as the corresponding devices in the transposition mechanism at the transmitter, the input circuits of bi-stable actuating device 83 receive pulses similar to those received by the input circuits of a corresponding bi-stable actuating device at the transmitter. Actuator 83 therefore produces an actuating or deflection-control signal for decoder 17 which is identical in wave form to that developed at the transmitter for coding the television signal initially. Decoder 17 consequently operates in time synchronism with a similar coder at the transmitter so that the signal applied to the input electrodes 18 of image-reproducing device 21 is suitably compensated to effect intelligible image reproduction.

In the embodiment of the invention shown in Figures 2 and 3, there is provided a plurality of code-determining devices which individually have a plurality of operating positions and collectively establish a prescribed code pattern in accordance with the instantaneous position of the devices with respect to one another. Preferably, these code-determining devices take the form of conventional manually operated 8-point rotary switches 110, 120, 130 and 140, each switch having a movable contact element (111, 121, 131, 141, respectively) and a series of stationary contact elements designated 1–8 to represent the eight operating positions. The stationary contacts corresponding to operating positions 1 and 5 of each switch are connected to common output circuit 91, the contacts corresponding to operating positions 2 and 6 are connected to common output circuit 92, the contacts corresponding to positions 3 and 7 are connected to output circuit 93, and the stationary contacts corresponding to positions 4 and 8 are connected to output circuit 94. Movable element 111 is connected to input circuit 51, movable element 121 is connected to input circuit 52, movable element 131 is connected to input circuit 53, and movable element 141 is connected to input circuit 54. With this arrangement, each switch establishes in each one of its operating conditions a predetermined circuit conditions between selected ones of the input and output circuits.

Two additional code-determining devices (not shown) identical to switches 110—140 are preferably employed for the system of Figure 1 to connect input circuits 55 and 56 to a selected one of the output circuits; however, since such additional devices may be identical to those shown and since the associated actuating apparatus is preferably similar to that hereinafter described in connection with devices 110—140, they have not been shown in order to avoid unduly encumbering the drawing.

Movable contact 111 is mechanically affixed to one end of a shaft 112*a*, the other end of which is mechanically connected to an 8-position adjusting knob 116. A ratchet wheel or gear 115 is also rigidly connected to shaft 112*a* and a mutilated spur gear or sprocket 113, having a series of eight irregularly spaced teeth 113*a–h* (Figure 3*a*) disposed about its periphery, is rotatably connected to the shaft. A pawl 114 is pivotally connected to gear 113 and its free end is adapted to engage the teeth of ratchet wheel 115. With this construction, when knob 116 is manually rotated in a clockwise direction, ratchet wheel 115 effects corresponding clockwise rotation of gear 113 by means of the coupling provided by pawl 114. On the other hand, if gear 113 is independently rotated in a clockwise direction, pawl 114 slides over the ratchet teeth of gear 15 so that no rotation of shaft 112*a* occurs.

Movable contact element 121 is rigidly connected to one end of a shaft 122*b*, and the other end of this shaft is rigidly affixed to a movable mechanism which may take the form of a spur gear or sprocket 127 having a series of eight regularly spaced teeth disposed about its periphery. A ratchet wheel 128 is rigidly connected to one end of a shaft 122*a*, the other end being mechanically affixed to an 8-point adjusting knob 126. A pawl 129 is pivotally connected to spur gear 127 and engages ratchet wheel 128 in such a manner that counterclockwise rotation of knob 126, and consequently shaft 122*a*, effects corresponding counterclockwise rotation of gear 127, whereas independent counterclockwise rotation of spur gear 127 results in no rotation of shaft 122*a* and knob 126. Movable mechanism or gear 127 and ratchet wheel 128 are so arranged with respect to gear 113 that gears 113 and 127 mesh so that rotation of one may effect rotation of the other. A ratchet wheel 125 is also rigidly affixed to shaft 122*b*, and a mutilated spur gear or sprocket 123 having a series of eight irregularly spaced teeth 123*a–h* (Figure 3*b*) disposed along its periphery is rotatably mounted on shaft 122*b*. A pawl 124 is provided to effect counterclockwise rotation of gear 123 in response to counterclockwise rotation of movable mechanism 127 and consequently shaft 122*b*, whereas independent counterclockwise rotation of gear 123 effects no movement of shaft 122*b*.

A similar mechanical arrangement is connected to code-determining device 130, as in the case of device 120. A shaft 132*b* is connected at one end to movable contact 131 and at the other end to a movable mechanism in the form of a spur gear or sprocket 137 which is so positioned that it engages mutilated spur gear 123. A pawl 139 and a ratchet wheel 138 couple gear 137 to one end of a shaft 132*a*, the other end being rigidly connected to an adjusting knob 136. The pawl is so positioned with respect to the teeth of ratchet wheel 138 that clockwise rotation of knob 136 and shaft 132*a* effects corresponding clockwise rotation of gear 137, but independent clockwise rotation of movable mechanism 137 results in no rotation of shaft 132*a* and knob 136. A ratchet gear 135 is also mechanically affixed to shaft 132*b* and a mutilated spur gear or sprocket 133 having a series of eight irregularly spaced teeth 133*a–h* (Figure 3*c*) is rotatably mounted on shaft 132*b*, a pawl 134 coupling gears 133 and 135 in such a way that clockwise rotation of movable mechanism 137 and consequently ratchet wheel 135 causes clockwise rotation of gear 133, while independent clockwise rotation of gear 133 effects no rotation of shaft 132*b*.

Finally, movable contact 141 of switch 140 is connected to one end of a shaft 142*a* while an adjusting knob 146 is connected to the other end. A ratchet wheel 148 is also rigidly connected to shaft 142*a* and a movable mechanism in the form of a spur gear or sprocket 147, which is arranged to engage mutilated gear 133, is rotatably mounted on shaft 142*a*. A pawl 149 is pivotally mounted on gear 147 and effects counterclockwise rotation of gear 147 in response to counterclockwise rotation of shaft 142*a*, while independent counterclockwise rotation of gear 147 effects no movement of shaft 142*a* and knob 146.

When coupling gears are employed having teeth so arranged that only one tooth is engaged at a time, as is illustrated in Figures 2 and 3*a–c*, it is usually desirable to provide a detent mechanism to insure that the spur gears are rotated in discrete and distinct steps. Such a detent mechanism has been omitted from Figure 2 in order to simplify the drawing, but one such mechanism is illustrated in Figure 3 in connection with spur gear 127. Of course, identical detent arrangements may be employed for gears 137 and 147.

Specifically, in order to insure positive stepping of movable mechanism 127, a detent wheel 151 having a series of eight saw-tooth shaped teeth exhibiting steep and sloping surfaces is rigidly connected to shaft 122*b*. A spring-loaded detent mechanism 152 engages detent wheel 151 in such a manner that wheel 151, and consequently shaft 122*b* and gear 127, are urged into distinct operating positions. When gear 127 and detent wheel 151 are rotated slightly in a counterclockwise direction in response to the movement of a tooth on gear 113, detent mechanism 152 follows wheel 151 up the steep-sided surface of one of its teeth until it reaches the crest or outermost vertex, at which time detent 152 is urged down the sloping surface to the lowermost vertex to effect a further rotation of detent wheel 151 and movable mechanism 127. Gear 127 is thus conditioned for subsequent rotation of gear 113, since the next succeeding tooth of movable mechanism 127 is positioned adjacent the next succeeding tooth of gear 113, if there is a tooth on gear 113 at that succeeding point.

Figures 3B, 3C, 4:
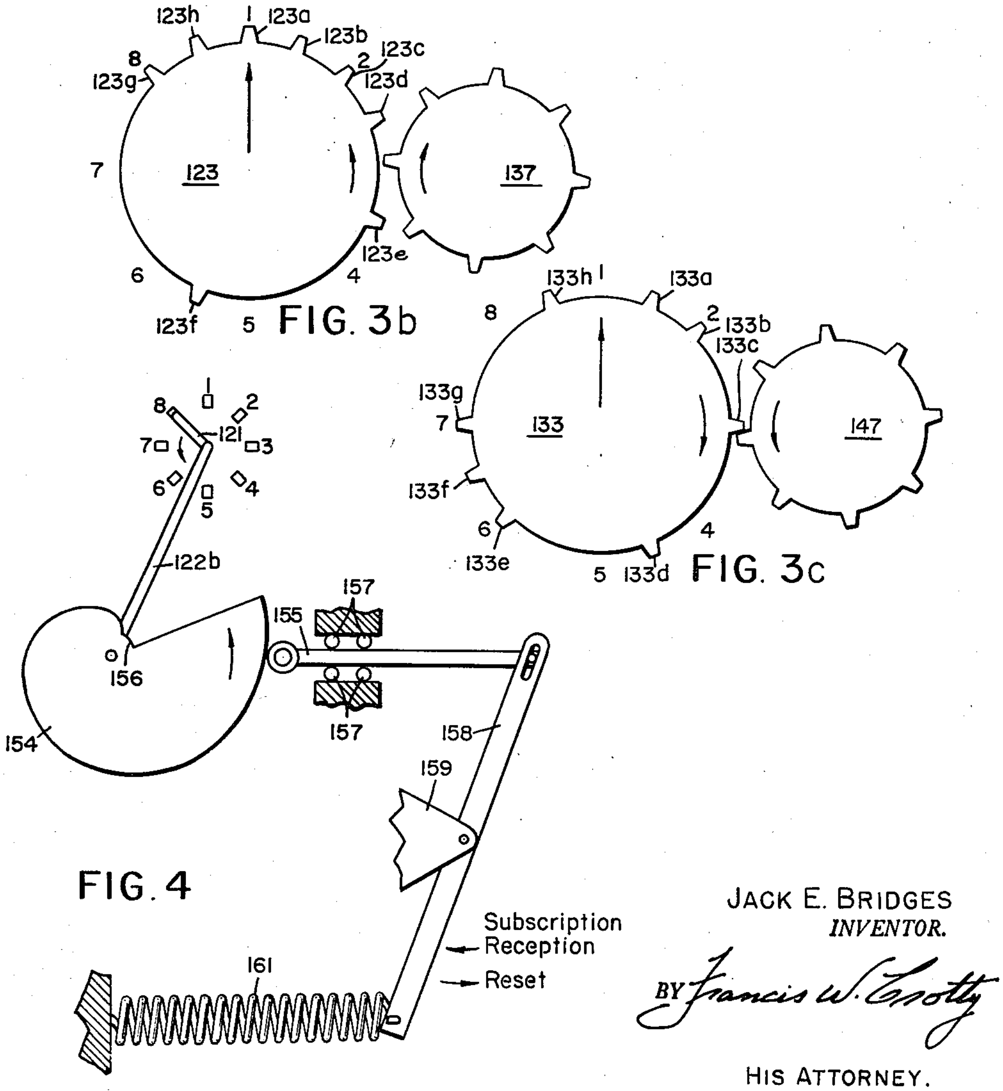

It may also be desirable to provide a resetting mechanism in order that all of the code-determining devices 110—140 may be adjusted or positioned to position 1 or "home" prior to each adjustment to a new switch setting combination. Such resetting mechanism has also been omitted from Figure 2 in order to simplify the drawings, but an exemplary reset apparatus is shown in Figure 4 in connection with shaft 122*b* and contact 121. Of course, similar resetting apparatus may be employed for rotating contacts 131 and 141 back to their "home" positions, although some reversal of parts is required to provide for clockwise rotation of contact 131; no additional resetting apparatus is necessary for contact 111 since this contact is under the exclusive control of rotatable knob 116 and therefore may be rotated to position 1 by means of that knob.

Specifically, a cam 154 is rigidly connected to shaft 122*b* at a location intermediate rotary contact 121 and the nearest gear 123 mounted on the same shaft, and a movable cam actuating mechanism 155, when in contact with cam 154, urges or forces this cam into counterclockwise rotation, resulting in corresponding counterclockwise rotation of movable contact 121. The cam is so oriented with respect to contact 121 that when the rotation of the cam is arrested, namely when mechanism 155 is adjacent point 156, contact 121 is positioned to position 1 or "home." Movable cam actuator 155 is guided by means of fixed guides 157 and is connected to a movable member 158, which in turn is pivoted by a fixed pivot element 159, in such a way that actuator 155 may be engaged or disengaged from cam 154 by operating member 158. While the transportation mechanism is adjusted to some setting for subscription television reception, cam actuator 155 is out of engagement with cam 154; this is achieved by means of spring 161 which normally holds actuator 155 away from the cam. When it is desired to reset switch 120, member 158 may be manually pivoted in the direction of the reset arrow to effect engagement of cam actuating mechanism 155 and cam 154 to consequently reset the switch to "home," as explained.

To reset all of the code-determining devices, knobs 116, 126, 136 and 146 are initially rotated to position 1 one at a time in the order named. Cam actuator 155 is then operated to rotate contact 121 to position 1 and subsequently similar cams and actuators may be operated to successively rotate contacts 131 and 141 to position 1. The transposition mechanism is now conditioned for subsequent manual adjustment to a prescribed switch setting.

In describing the operation of the invention, it may be convenient to consider an illustrative switch setting. As the mechanism is shown in Figures 2 and 3*a–c*, all of the various switches and knobs are adjusted to their first or "home" positions. Assume now that the particular code combination for a given television program, as far as the switches shown are concerned, is 7436. For effecting proper decoding the subscriber initially rotates knob 116 in a clockwise direction to position 7, resulting in the rotation of movable contact 111 to position 7.

Gear 113 is also rotated in a clockwise direction to position 7 in response to the rotation of knob 116 through the effect of ratchet wheel 115 and pawl 114. Consequently, as may be noted particularly in Figure 3, teeth 113*a–c* and 113*h–e*, seven in all, are individually moved into engagement with the teeth of movable mechanism 127 to cause counterclockwise rotation thereof and also counterclockwise rotation of movable contact 121 seven steps to position 2. Also in response to the rotation of movable mechanism 127, gear 123 rotates seven steps in a counterclockwise direction from position 1 to position 2, resulting in the engagement of teeth 123*a, b, e–h*, six in all, with the teeth of movable mechanism 137 to effect clockwise rotation of gear 137 and movable contact 131 six steps from position 1 to position 7. Rotation of gear 137 also effects clockwise rotation of gear 133 to position 7, resulting in the engagement of teeth 133*a–c, e–h*, seven in all, with the teeth of movable mechanism 147. Gear 147 is consequently rotated in a counterclockwise direction seven steps to effect rotation of movable contact 141 from position 1 to position 2.

In short, by merely adjusting knob 116 to position 7 the subscriber has effected the positioning of switches 110, 120, 130, 140, to positions 7, 2, 7, 2, respectively. Moreover, switches 120, 130 and 140 have been adjusted without disturbing the settings of their respective indicating knobs 126, 136, 146, since the knobs are decoupled from gears 127, 137, and 147 by the respective pawl and ratchet arrangements. It should be apparent that the spacing of the teeth on the gears 113, 123 and 133 has a very definite effect on the positioning of the switches, and by merely changing the spacing of one or more of such sets of teeth entirely different switch settings may be realized. In fact, a sufficiently large number of permutations may be achieved with different orientations of mutilated gears from a single punch die to provide literally thousands of individually unique code-determining devices, each with identical electrical wiring, so that the switch setting information for each subscriber is unique and not related in any readily determinable way to that disseminated to other subscribers.

The subscriber next rotates knob 126 in a counterclockwise direction five steps to position 4 causing movable contact 121 to be rotated five steps in a counterclockwise direction from position 2 to position 5. The setting of switch 110 is unaffected since clockwise rotation of gear 113, due to the counterclockwise rotation of knob 126 and gear 127, has no effect on shaft 112*a* and contact 111 inasmuch as cam 114 rides or slides over the teeth of ratchet wheel 115 without effecting rotation thereof. Counterclockwise rotation of knob 126 also effects counterclockwise rotation of gear 123 by means of ratchet wheel 125 and pawl 124 from position 2 to position 5, resulting in the engagement of teeth 123*c–f*, four in all, with the teeth of movable mechanism 137 to effect clockwise rotation of gear 137 and movable contact 131 four steps from position 7 to position 3. Also in response to the rotation of movable mechanism 137, gear 133 rotates in a clockwise direction from position 7 to position 3 causing the engagement of teeth 133*a–d*, four in all, with teeth of movable mechanism 147, effecting rotation of gear 147 and movable contact 141 four steps in a counterclockwise direction from position 2 to position 6. Thus, by positioning knob 116 to position 7 and knob 126 to position 4, switches 110, 120, 130, 140 are adjusted to positions 7, 5, 3, 6, respectively.

Knob 136 is subsequently manually operated in a clockwise direction to position 3, effecting clockwise rotation of movable contact 131 two steps from position 3 to position 5. Switches 110 and 120 are not affected due to the fact that counterclockwise rotation of gear 123 caused by clockwise rotation of gear 137 has no effect on shaft 122*b*. Gear 133 is also rotated in a clockwise direction from position 3 to position 5 in response to the rotation of knob 136. Tooth 133*h* is therefore moved into engagement with a tooth of movable mechanism 147 to effect counterclockwise rotation of movable contact 141 one step from position 6 to position 5. Thus, in response to the adjustment of knobs 116, 126 and 136, switches 110, 120, 130, 140 are adjusted to positions 7, 5, 5, 5, respectively.

Finally, to complete the switch setting, knob 146 is rotated by the subscriber in a counterclockwise direction to position 6, effecting counterclockwise rotation of movable contact 141 three steps from position 5 to position 2. Switches 110, 120 and 130 are unaffected since shaft 132*b* is not rotated by independent clockwise rotation of gear 133 caused by counterclockwise rotation of gear 147. Thus, when all of the various knobs are adjusted according to the illustrative code combination 7436, switches 110, 120, 130, 140 are positioned to positions 7, 5, 5, 2, respectively. Input circuit 51 is therefore connected to output circuit 93 via switch 110, input circuit 52 is connected to output circuit 91 through switch 120, input circuit 53 is connected over switch 130 to output circuit 91, and input circuit 54 is connected to output circuit 92 via switch 140.

By way of summary, switches 110—140 constitute a plurality of code-determining devices which individually have a plurality of operating conditions and collectively establish a prescribed code pattern in accordance with the instantaneous positions of each of the code-determining devices with respect to one another. Moreover, spur gear 127, for example, constitutes a movable mechanism coupled by means of shaft 122*b* to an assigned one of the code-determining devices, namely 120, for varying the operating position thereof. A plurality of actuating devices (knob 126, shaft 122*a*, ratchet wheel 128 and pawl 129 as one actuating device and knob 116, shaft 112*a*, ratchet wheel 115, pawl 114 and mutilated gear 113 as another actuating device) are individually mechanically coupled to movable mechanism 127 for individually partially determining the position of the mechanism and conjointly controlling the operating position of the assigned code-determining device 120, at least one of the actuating devices (such as the actuating device comprising knob 116, shaft 112*a*, ratchet wheel 115, pawl 114 and gear 113) also at least partially controlling the operating position of another one of the code-determining devices, namely switch 110.

Thus, each movable mechanism 127, 137 and 147 operates under the control of a different group of actuating devices. The positioning of gear 127 is determined by the positioning of knobs 116 and 126; the rotation of gear 137 is determined by the rotation of knobs 116, 126 and 136; and the positioning of gear 147 is established by the adjustment of knobs 116, 126, 136 and 146. In this manner, the knob settings are in no readily ascertainable way indicative of the true switch settings, and unauthorized dissemination of switch setting information is effectively precluded.

Although sprocket type gear movements have been illustrated, many other suitable arrangements may be employed; for example, the well-known Geneva movement may very conveniently be utilized in lieu of the sprocket arrangement shown.

By the utilization of multilated gears 113, 123 and 133 and movable mechanisms 127, 137 and 147, it is possible to establish an extremely large number of different switch setting combinations. Moreover, merely by substituting different gears in place of 113, 123 and 133 having slightly different tooth arrangements, by differently orienting similar gears, or by employing gears with different numbers of teeth, the circuits established by a given code combination may be completely changed, although the electrical wiring of all units may be standardized. It is therefore possible to provide each one of many thousands of subscribers in an area with a distinctive driving arrangement in his transposition mechanism so that for any one particular program each subscriber requires a different code combination or knob setting in order to establish the same circuitry between input and output circuits. Additionally, the mechanical interlinkages between the various switch elements make it virtually impossible for a person bent on fraud to attempt to arrive at the proper switch setting pattern by a cut and try approach, or by comparison with the switch settings of other subscribers. The invention provides, therefore, an adjusting mechanism for the code-determining devices of a subscription television system which is relatively simple in construction and provides fully adequate security while being capable of establishing an extremely large number of code combinations.

While a particular embodiment of the invention has been shown and described, modifications may be made, and it is intended in the appended claim to cover all such modifications as fall within the true spirit and scope of the invention.

I claim:

An encoding apparatus for a subscription television system comprising: a plurality of input circuits; a plurality of output circuits; a plurality of rotatable switches for permutably connecting said input circuits to said output circuits in accordance with a selected one of a multiplicity of possible permutation patterns as determined by the instantaneous positions of said rotatable switches; a plurality of rotatable gears each having a series of uniformly spaced teeth; means mechanically coupling said gears to respective assigned ones of said switches for varying the positions thereof; a plurality of independently and manually rotatable actuating controls; a plurality of one-way driving mechanical connections individually intermediate an assigned one of said actuating controls and an assigned one of said gears for effecting movement of said gears; and a plurality of additional one-way driving mechanical connections, each of which includes a mutilated gear having a series of non-uniformly spaced teeth, individually intermediate an assigned one of said actuating controls and an assigned one of said gears for also effecting movement of said gears such that the position of each gear is determined conjointly by at least two of said actuating controls.

References Cited in the file of this patent

UNITED STATES PATENTS 2,332,304 Davies ---------------- Oct. 19, 1943

FOREIGN PATENTS 529,740 Germany -------------- July 18, 1931